United States Patent
Hiltunen

(10) Patent No.: US 6,535,578 B1
(45) Date of Patent: Mar. 18, 2003

(54) FAULT CONTROL AND RESTORATION IN A DATA COMMUNICATION SYSTEM

(75) Inventor: Seppo Hiltunen, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/762,208

(22) PCT Filed: Aug. 3, 1999

(86) PCT No.: PCT/EP99/05658

§ 371 (c)(1), (2), (4) Date: May 25, 2001

(87) PCT Pub. No.: WO00/08873

PCT Pub. Date: Feb. 17, 2000

(30) Foreign Application Priority Data

Aug. 6, 1998 (FI) .................................................. 981705

(51) Int. Cl.⁷ ............................ H04M 1/24; H02H 3/05
(52) U.S. Cl. ......................... 379/9; 379/1.01; 379/9.02; 379/14; 379/32.01; 714/2; 714/23
(58) Field of Search ............................... 379/1.01, 1.03, 379/9, 9.02, 9.04, 14, 15.01, 37.01, 32.02, 33, 9.05, 9.06, 14.01, 22.03, 29.01; 714/2, 23, 25, 30, 31, 47, 48, 49; 709/224, 244

(56) References Cited

U.S. PATENT DOCUMENTS

| | | |
|---|---|---|
| 4,361,832 A * | 11/1982 | Cole .......................... 340/505 |
| 4,887,076 A | 12/1989 | Kent et al. |
| 5,274,838 A | 12/1993 | Childress et al. |
| 5,423,026 A * | 6/1995 | Cook et al. .................... 714/23 |
| 5,636,341 A | 6/1997 | Matsushita et al. |
| 5,907,670 A * | 5/1999 | Lee ........................ 395/182.02 |
| 5,970,072 A * | 10/1999 | Gammenthaler, Jr. et al. ... 370/537 |
| H1860 H * | 9/2000 | Asthana et al. ................. 379/9 |
| 6,170,067 B1 * | 1/2001 | Liu et al. ...................... 714/48 |

FOREIGN PATENT DOCUMENTS

| JP | 05090901 | 4/1993 |
|---|---|---|
| JP | 05282224 | 10/1993 |

* cited by examiner

Primary Examiner—Stella Woo
Assistant Examiner—Quoc Tran

(57) ABSTRACT

A method of controlling a multi-channel processor board (1a) in a telecommunications system comprises monitoring the fault status of a multiplicity of processor cores (3), each arranged to process one or more speech channels, distributed amongst a plurality of Digital Signal Processors (DSPs) (2a–2d) of the processor board (1a). Monitoring comprises receiving fault alarms from fault containing DSPs at an on-board controller (5), and notifying an off-board controller (8) of a received fault alarm including identifying the faulty core(s) and/or associated speech channels. The off-board controller (8) returns to the on-board controller (5) a reset command, whereupon the on-board controller (5) identifies which of the processor cores (3) are faulty and either issues corresponding individual core reset commands or issues DSP reset commands to reset the DSPs (1a–1d) to which the faulty cores (3) belong.

6 Claims, 2 Drawing Sheets

FAULT CONTROL AND RESTORATION IN A DATA COMMUNICATION SYSTEM

FIELD OF THE INVENTION

The present invention relates to fault control and restoration in a data communication system and is applicable in particular to the off-board control of multi-channel data processing boards.

BACKGROUND OF THE INVENTION

Modern telecommunications systems, such as telephone exchanges, often employ a modular architecture which simplifies both maintenance and upgrading. In addition, by modularising a system the system can be made more fault tolerant, e.g. failure of one component will only result in the loss of a limited amount of processing capacity.

Considering the example of speech encoding in an exchange of a telecommunications network, multiple channels may be encoded in parallel by a single speech processing board, the board containing several Digital Signal Processors (DSPs) with each DSP having in turn several separate DSP cores capable of independently encoding respective speech signals. Thus, a board provided with eight DSPs, each having four DSP cores, may process thirty two speech channels in parallel. A given exchange may have several hundred such boards providing an extremely large overall channel capacity. The capacity may be even greater where individual processor cores are capable of handling multiple speech channels.

The task of controlling such a large number of processor boards is usually allocated to a "central" control processor which is common to all boards (referred to hereafter as the "off-board controller"). The off-board controller monitors the status of the processor boards and allocates incoming speech channels accordingly. In particular, the off-board controller is notified of on-board faults so that appropriate channel termination, reallocation and restoration measures may be taken.

Each processor board is typically provided with an on-board controller which receives fault notification messages from individual DSPs on the board. These notifications include an identification of particular DSP cores identified as faulty. This information is then passed to the off-board controller where a decision is made regarding which of the processor cores should be reset. For example, an initial step may be to return an instruction to the on-board controller to reset only a DSP core notified as faulty. If the fault alarm is not cleared by this action, then the off-board controller may return a second command, identifying the DSP to which the faulty core belongs, and instructing that the entire DSP be rest. If this action still fails to clear the fault alarm, then the off-board controller may return a command to reset the entire processor board.

As has already been mentioned above, an intended advantage of a modularised architecture is to enable individual modules of a system to be upgraded without necessarily requiring the simultaneous upgrading of other system modules. However, in the case of the architecture described in the preceding paragraph, the upgrading of a processor board, e.g. to provide an increased number of channels per board, requires that the software of the off-board controller also be upgraded. If, for example, a new board is introduced in which the number of processor cores per DSP is increased from four to six, this requires a redefinition of the core groupings in the off-board controller in order that the off-board controller may issue a DSP level reset command to the correct DSP.

SUMMARY OF THE PRESENT INVENTION

It is an object of the present invention to overcome or at least mitigate the above noted disadvantage of existing telecommunications systems. In particular, it is an object of the present invention to reduce the dependency of the off-board controller on the architecture of individual processor boards.

These and other objects are achieved by transferring at least part of the restoration decision responsibility from the off-board controller to the on-board controller.

According to a first aspect of the present invention there is provided a method of controlling a multi-channel processor board in a telecommunications system, the method comprising:

monitoring the fault status of a multiplicity of processor cores, each arranged to process one or more speech channels, distributed amongst a plurality of Digital Signal Processors (DSPs) of the processor board, including receiving fault alarms from fault containing DSPs at an on-board controller;

notifying an off-board controller of a received fault alarm including identifying the faulty core(s) and/or associated speech channels;

returning from the off-board controller to the on-board controller a reset command; and identifying at the on-board controller which of the processor cores are faulty and either issuing corresponding individual core reset commands or issuing DSP reset commands to reset the DSPs to which the faulty cores belong.

Embodiments of the present invention leave the identification, if necessary, of the DSP containing a faulty core to the on-board controller. There is thus no need for the core/DSP association to be known to the off-board controller and the core grouping may be changed without necessitating any change in the software of the off-board controller.

Preferably, in response to receipt of a first reset command at the on-board controller, individual core reset commands are issued therefrom. More preferably, in response to receipt of a second reset command at the on-board controller, the DSPs to which faulty cores belong are identified and DSP reset commands issued to reset the identified DSPs.

According to a second aspect of the present invention there is provided apparatus for controlling a multi-channel processor board in a telecommunications system, the apparatus comprising:

an on-board controller arranged to monitor the fault status of a multiplicity of processor cores, each arranged to process one or more speech channels, distributed amongst a plurality of Digital Signal Processors (DSPs) of the processor board, including receiving fault alarms from fault containing DSPs at the on-board controller; and an off-board controller arranged to receive fault alarms including an identification of the faulty core(s) and/or the associated speech channels, and to return to the on-board controller a reset command, the on-board controller being further arranged to identify which of the processor cores are faulty and to either issue a corresponding individual core reset commands or issue DSP reset commands to reset the DSPs to which the faulty cores belong.

Preferably, the apparatus of the invention comprises a memory associated with the on-board controller and arranged to store the identity of cores from which fault alarms have been received. The memory may also be arranged to store the identity of the DSP to which a faulty core belongs.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

Figure 1:
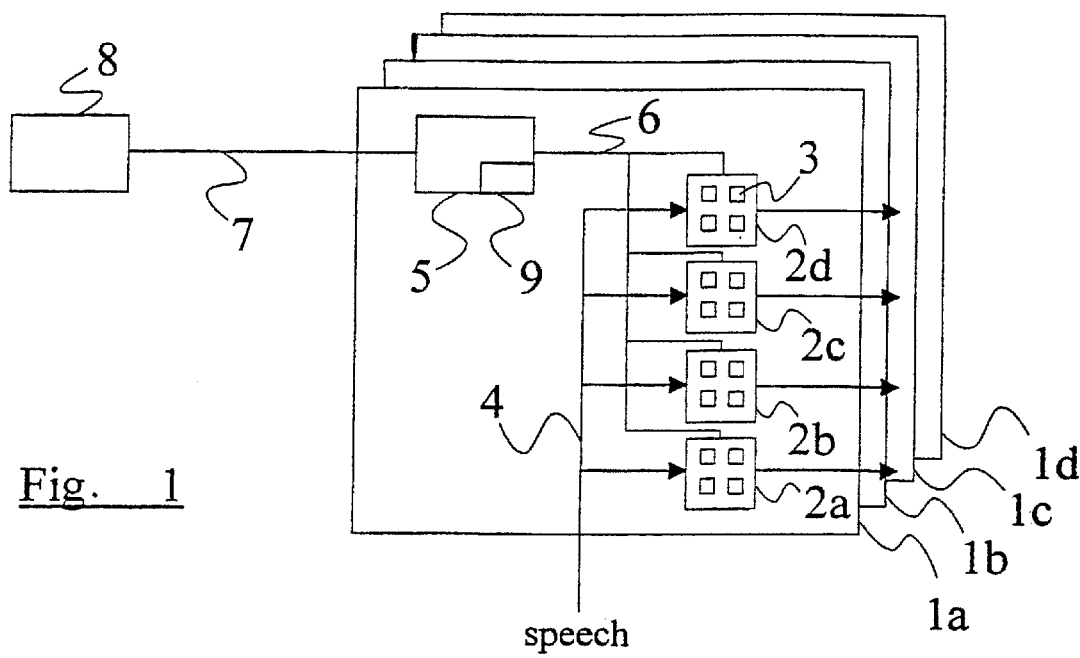
FIG. 1 illustrates in block diagram form a telecommunications system with a processor board and on and off-board controllers.

There is shown in FIG. 1 a signal processing system arranged to process in parallel a multiplicity of speech signals. For example, the system may carry out signal encoding, decoding, or echo cancellation. The system comprises a number of substantially identical processor boards 1a to 1d. Each processor board comprises a set of four Digital Signal Processors (DSPs) 2a to 2d and each of these DSPs has in turn four processor cores 3.

Each processor core 3 is capable of independently processing one speech channel received via a speech signal input bus 4.

Each processor board 1a to 1d comprises an on-board controller 5 (e.g. a suitably programmed micro-processor) which is coupled in parallel to the four DSPs 2a to 2d via a control bus 6. The on-board controller 5 is also coupled via an interface bus 7 to an off-board controller 8 (which is again typically provided by a suitably programmed microprocessor or computer). The off-board controller 8 provides control for multiple processor boards 1a to 1d will be described below.

The on-board controller 5 is arranged to detect faults which arise in the DSPs 2a to 2d and more particularly in specific cores 3 of the DSPs. Detection may be achieved in many different ways known to the person of skill in the art and will not therefore be described in detail here. However, detection generally involves analysing the response of a DSP 2a to 2d to certain specific signals sent to the DSP from the on-board controller 5. Whatever specific detection technique is utilised, the response of the on-board controller 5 to a detected fault is to record in its internal memory 9 the ID of the faulty core and to transmit an alarm message (ALARM) to the off-board controller 8 via the interface bus 7. This alarm message includes both an alarm identifier and the faulty core ID. This is illustrated in FIG. 2 which illustrates a series of three ALARM messages transmitted in respect of processor cores x, y, and z (a single alarm message may be sent instead, including a bitmap identification of the faulty cores).

Upon receipt of an alarm message, the off-board controller 8 first determines whether or not the identified faulty core is currently in use for a speech channel. If it is, the off-board controller 8 disconnects, or reroutes to another DSP core (on the same board or on another board), the speech channel. A further alarm message may also be sent to a central computer of the system operator (not shown in FIG. 1) Once this process is completed, the off-board controller 8 returns a RESTORE command to the on-board processor 5 via the interface bus 7. This command is a "generic" command in so far as it does not identify any specific processor cores or DSPs to be reset. Rather, the decision upon which cores/DSPs to reset is taken by the on-board controller 5 following receipt of the RESTORE command. The first action of the on-board controller 5 is to issue a RESET command to the or each faulty core 3 (i.e. a core level RESET) originally identified as faulty and which were recorded in the on-board controller's internal memory 9. The nature of this RESET command will not be described in detail here, suffice to say that each command is directed to a specific core and causes the corresponding DSP to perform a reset routine (usually reinitialisation) on the faulty core 3.

After the faulty core or cores 3 have been reset, the on-board controller 5 again interrogates the faulty core(s) to determine if faults still exist. If the reset action has cleared the faults, then no further action need be taken in this matter by either the on-board or off-board controller 5, 8 (a RESTORE_OK message is sent from the on-board controller 5 to the off-board controller 8). However, if one or more faults remain, then further action is required. In particular an ALARM message is sent to the off-board controller 8 via the interface bus 7. This alarm message identifies all of the processor cores 3 which belong to DSPs 2a–2d having a faulty core. The off-board controller 8 then reallocates or terminates the speech channels allocated to the identified cores 3.

Figure 2:
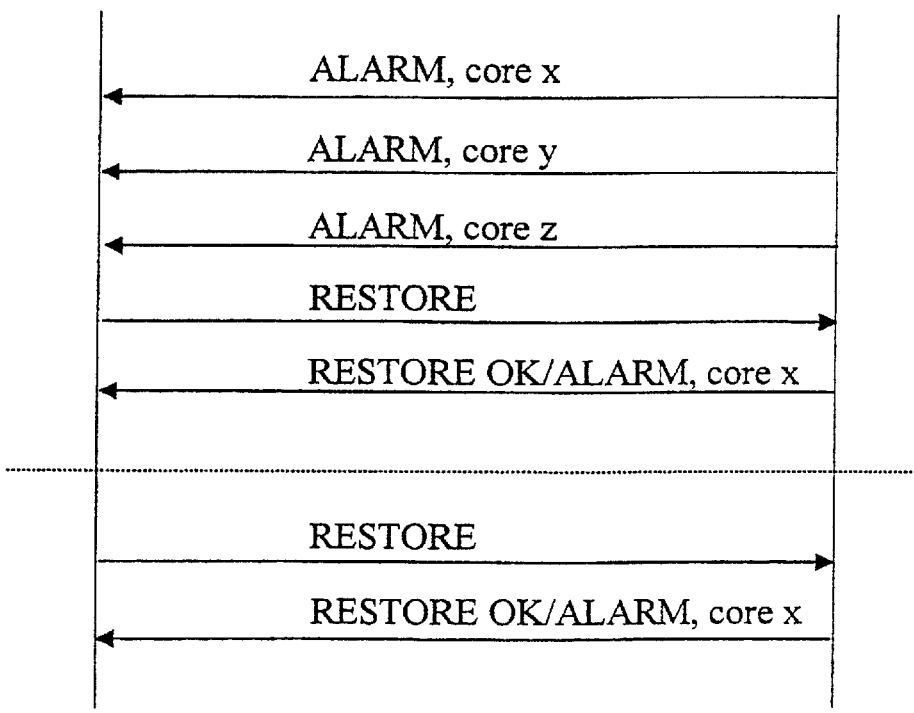
FIG. 2 illustrates signalling in the system of FIG. 1.

After a short delay during which this channel reallocation/termination process is carried out, the off-board controller 8 again issues a RESTORE command to the on-board processor 5 (as shown beneath the broken line in FIG. 2). This command is identical to the earlier issued RESTORE command. However, the on-board processor 5 is aware that the RESTORE command is the second in a series and acts upon it by issuing a DSP level RESET command to the or each fault containing DSP 2a to 2d. This causes all of the cores 3 in those DSPs to be reset. It will be appreciated that this DSP level action causes a greater loss of processing capacity than the core level reset action and so is carried out only as a second resort.

Figure 3:
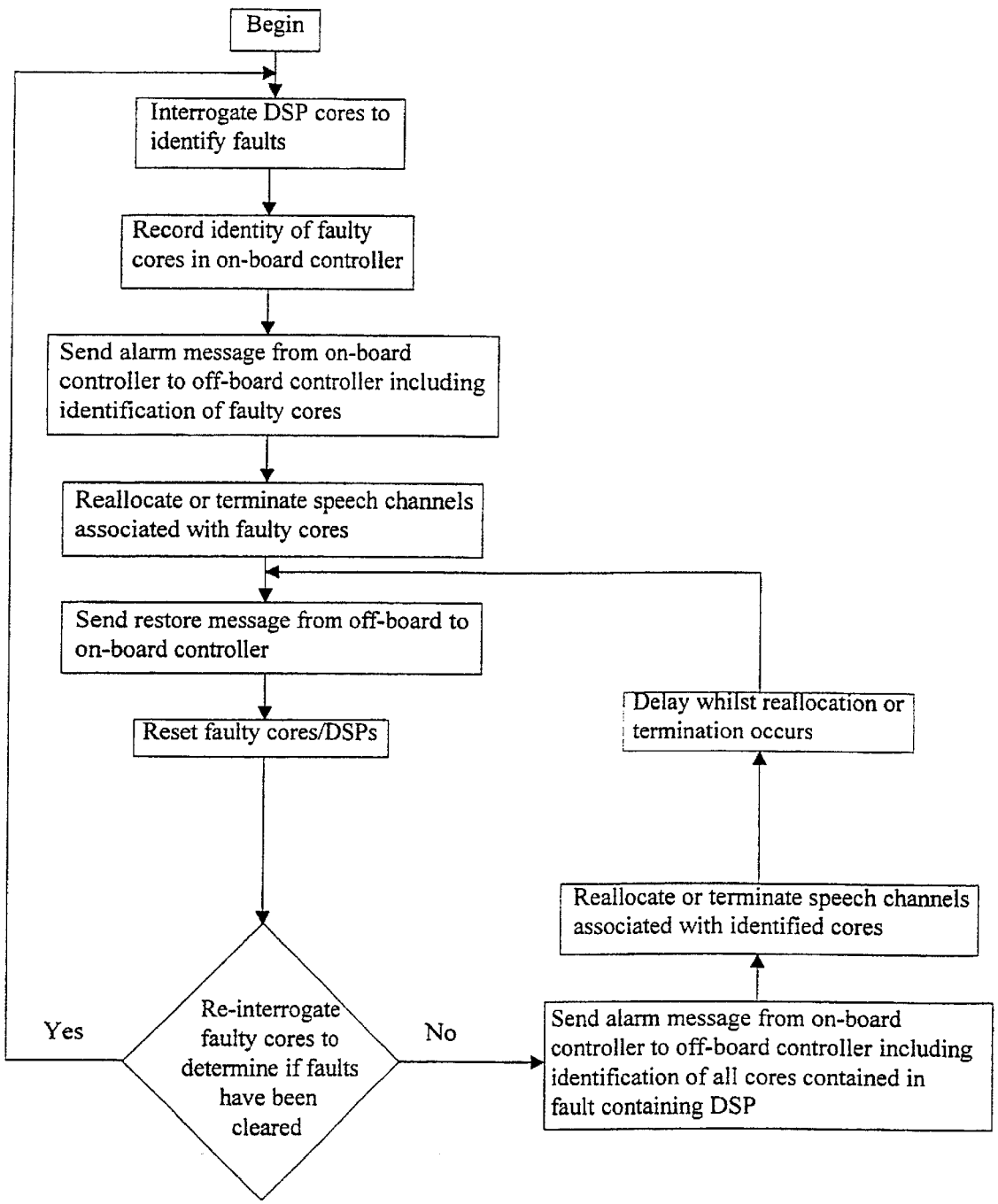
FIG. 3 is a flow chart illustrating a method of operating the system of FIG. 1.

The process described above is further illustrated by way of the flow chart of FIG. 3.

It is to be noted that if the DSP reset action still fails to clear the fault alarm(s), an alarm message is again returned to the off-board controller 8. This may result in an alarm being triggered at a central control site of the telephone network operator (not shown in FIG. 1), indicating that service personnel should be sent to investigate the fault.

It will be appreciated that various modifications may be made to the above described embodiment without departing from the scope of the present invention. For example, the initial RESTORE signal given by the off-board controller 8 to the on-board controller 5 may be accompanied by a command giving the on-board controller 5 independent authority to carry out a DSP level reset in the event that the core level reset fails to clear the alarm fault. Similarly, authority may be given to the on-board controller 5 to conduct a board level reset.

In a further modification to the above described embodiment, instead of identifying cores in the alarm message sent from the on-board controller to the off-board controller, speech channels associated with the faulty cores may be identified.

What is claimed is:

1. A method of controlling a multi-channel processor board in a telecommunications system, the method comprising:

monitoring, by a controller on-board the multi-channel processor board, the fault status of a multiplicity of processor cores, each arranged to process one or more speech channels, distributed amongst a plurality of Digital Signal Processors (DSPS) of the processor board, said monitoring step including receiving fault alarms from fault containing DSPs said fault alarms identifying faulty core(s) and/or associated speech channels;

sending an alarm notification from the on-board controller to an off-board controller, said alarm notification identifying the faulty core(s) and/or associated speech channels;

returning a reset command from the off-board controller to the on-board controller;

identifying by the on-board controller, which of the processor cores are faulty; and issuing by the on-board controller, either corresponding individual core reset commands, or DSP reset commands to reset the DSPs to which the faulty cores belong.

2. The method according to claim 1, wherein the step of sending an alarm notification from the on-board controller to the off-board controller includes sending a plurality of alarm notifications from a plurality of on-board controllers on a plurality of multi-channel processor boards to the off-board controller.

3. The method according to claim 1, wherein the step of issuing by the on-board controller, either corresponding individual core reset commands or DSP reset commands, includes issuing individual core reset commands in response to receipt of a first reset command at the on-board controller.

4. The method according to claim 3, wherein the step of issuing by the on-board controller, either corresponding individual core reset commands or DSP reset commands, includes, in response to receipt of a second reset command at the on-board controller:

identifying the DSPs to which the identified faulty cores belong; and issuing DSP reset commands to reset the identified DSPs.

5. An apparatus for controlling a multi-channel processor board in a telecommunications system, said processor board having a multiplicity of processor cores, each arranged to process one or more speech channels, and being distributed amongst a plurality of Digital Signal Processors (DSPs), the apparatus comprising:

a controller on-board the processor board arranged to monitor the fault status of the multiplicity of processor cores and to receive fault alarms from fault containing DSPs; and read an off-board controller in communication with the on-board controller and arranged to receive fault alarms from the on-board controller, said fault alarms including an identification of the faulty core(s) and/or the associated speech channels, and to return to the on-board controller a reset command, the on-board controller being further arranged to identify which of the processor cores are faulty and to either issue corresponding individual core reset commands or issue DSP reset commands to reset the DSPs to which the faulty cores belong.

6. The apparatus according to claim 5, comprising a memory associated with the on-board controller and arranged to store the identity of cores from which fault alarms have been received.

* * * * *